United States Patent [19]

Kachik et al.

[11] 4,005,742
[45] Feb. 1, 1977

[54] METHOD OF RESTORING INGOT MOLD STOOLS AND CLOSED-BOTTOM INGOT MOLD

[75] Inventors: Robert H. Kachik, Washington Township, Westmoreland County; Samuel J. Manganello, Penn Hills Township, Allegheny County; Arthur J. Pignocco, Franklin Township, Westmoreland County, all of Pa.

[73] Assignee: United States Steel Corporation, Pittsburgh, Pa.

[22] Filed: Mar. 8, 1976

[21] Appl. No.: 664,793

Related U.S. Application Data

[60] Continuation-in-part of Ser. No. 517,991, Oct. 25, 1974, abandoned, which is a division of Ser. No. 332,870, Feb. 15, 1973, abandoned.

[52] U.S. Cl. .................................. 164/54; 164/92; 164/94; 164/DIG. 12
[51] Int. Cl.² .................. B23K 23/00; B22D 19/10
[58] Field of Search .................. 164/53, 54, 72, 91, 164/92, DIG. 12, 33, 94; 228/241; 427/135

[56] References Cited

UNITED STATES PATENTS

| | | | |
|---|---|---|---|
| 3,264,696 | 8/1966 | Funk | 164/54 |
| 3,340,082 | 9/1967 | Meyer et al. | 164/72 X |
| 3,357,481 | 12/1967 | Snyder | 164/72 |
| 3,396,776 | 8/1968 | Funk | 164/92 |
| 3,421,570 | 1/1969 | Guntermann | 228/241 X |
| 3,540,514 | 11/1970 | Hammerton | 117/5.3 X |
| 3,674,518 | 7/1972 | Vuaroqueaux | 164/72 X |
| 3,856,076 | 12/1974 | Adams et al. | 164/92 X |
| 3,942,578 | 3/1976 | Kochik et al. | 164/92 X |
| 3,946,793 | 3/1976 | Kochik et al. | 164/54 |

FOREIGN PATENTS OR APPLICATIONS

| | | | |
|---|---|---|---|
| 1,587,253 | 3/1970 | France | 228/241 |
| 2,014,608 | 10/1970 | Germany | 164/91 |
| 2,450,043 | 5/1975 | Germany | |

Primary Examiner—Ronald J. Shore
Attorney, Agent, or Firm—Forest C. Sexton

[57] ABSTRACT

A method of repairing large castings, such as ingot molds and mold stools, by employing an aluminothermic reduction reaction without using containment perimeters and without preheating the casting. The resultant repaired article has a metallurgically bonded plug in the hole or eroded surface with a thick abrasion-resistant slag covering over the deposited metal.

19 Claims, 4 Drawing Figures

METHOD OF RESTORING INGOT MOLD STOOLS AND CLOSED-BOTTOM INGOT MOLD

This application is a Continuation-In-Part of application Ser. No. 517,991, filed Oct. 25, 1974, and now abandoned, which was a division of application Ser. No. 332,870, filed Feb. 15, 1973, now abandoned.

This invention relates to a relative inexpensive method for repairing ingot molds and stools and closed-bottom ingot molds which utilize an aluminothermic reduction (ATR) bulk metal deposition process to effect such repair.

A practical method for the repair of ingot molds and stools damaged in service has been in great demand by steelmakers because mold and stool performance relates directly to the cost of steel production. Among the major reasons for the scrapping or rejecting of molds and stools, which are usually made of cast iron, are cracking of mold walls and stool seats, and erosion of mold bottoms and stool seats. Conventional bulk welding methods for the repair of mold and stools are costly, time-consuming, and usually unsatisfactory as the weldments often crack and fall out. In an attempt to improve the welding method and to lock in the weldment, V- or U-shaped notches or grooves or dovetailed grooves are machined into the surface and the notches are filled with weld metal. This procedure has been generally successful, but remains quite costly. Attempts to fill cracks and craters with ceramic material have failed. Steel plates, spiked into place over cracks and holes on the outside of molds, have been used to contain and prevent cracks in molds from propagating further, but again this type of repair is not completely satisfactory as molten metal can still enter the cracks and holes making ingot stripping extremely difficult.

In U.S. Pat. No. 3,629,928, Hammerle, a repair method is described in which a groove is first cut along the damaged area in the mold wall. A plurality of nails or bolts are anchored in the damaged area such that the heads thereof are exposed in the groove. The groove is filled with weld metal such that a breakout of the weld metal is minimized. Although successful, the method is very expensive.

We are aware of the following prior art concerning aluminothermic welding processes:
Millward U.S. Pat. No. 1,594,182
Carpenter et al U.S. Pat. No. 2,515,191
Funk U.S. Pat. No. 3,264,696
Funk U.S. Pat. No. 3,396,776
Guntermann U.S. Pat. No. 3,421,570

Aluminothermic reduction (ATR) techniques have been used in the past to repair castings such as ingot molds and mold stools. In those processes, it is common practice to perform an appreciable amount of surface conditioning before the metal is deposited. For example, surface scale is usually removed from the casting and many have thought it essential to undercut the casting surface so that the deposited metal is "keyed" in, i.e. locked in place so that it will not fall out even if it is not bonded to the casting. In addition, it has been thought necessary that casting must be preheated in order to assure a good weld bond of the deposited metal. Since a given volume of ATR powder will yield only about a fifth as much deposited metal, by volume, it has always been necessary to use a containment perimeter to confine the ATR powder and ATR reaction products to the site to be repaired. That is to say, in order to fill a crater of given volume with a like volume of ATR deposited metal, the volume of ATR powder used must be five times greater. Hence, a refractory perimeter system is necessary to confine the ATR powder directly over the cavity to be filled. In addition, the perimeter system becomes necessary to similarly confine the molten reaction products which also have a volume greater than the cavity. That is, to yield a volume of metal equal to the volume of the cavity, an even greater volume of slag is necessarily produced. After the reaction is effected and while the reaction products are still in the molten condition, the heavier metal product will settle to the bottom filling the cavity, while the slag portion accumulates at the top within the volume defined by the refractory perimeter system. After the reaction products have solidified, the perimeter system and overlaying slag are removed, leaving the deposited metal in the cavity.

This invention concerns a method for repairing large castings, such as ingot molds and stools, particularly a method of filing erosion craters therein, which employs an exothermic reduction reaction, such as an aluminothermic reduction reaction, and which does not require the above described complicated procedures. This method does not require any surface conditioning, any preheating nor the use of a perimeter system. The chemical reaction can be represented as:

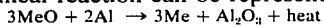

$$3MeO + 2Al \rightarrow 3Me + Al_2O_3 + \text{heat}$$

where MeO represents the oxide of the metal to be deposited, such as hematite ($Fe_2O_3$), Al is the aluminum fuel and $Al_2O_3$ the oxide of aluminum, which is a major constituent of the resulting slag. One novel and critical step in our method is the proper disposition of the ATR charge when the ATR reaction is initiated. The ATR charge, consisting of a stoichiometric mixture of aluminum and iron oxide, is placed within the defective area such as an erosion pit, etc. Since the reaction takes place and the superheated metal is generated in intimate contact with the substrate surface instead of in a crucible as is normally practiced, the heat of reaction is efficiently utilized, thereby enhancing the bonding of the deposited metal to the steel substrate.

It is the primary object of this invention to provide a method of repairing large castings such as ingot molds and stools which requires no surface preparation of the casting, no preheating and no perimeter system.

It is another object to provide a method of repairing ingot molds or stools which is quick and economical.

It is also an object to provide a method of repairing ingot molds and stools that can be performed without elaborate or expensive equipment.

It is another object to provide a method of repairing mold stools that can be performed without removing the stools from the ingot cars on which they are mounted.

It is a further object to provide a method for forming a high-melting, abrasion-resistant ceramic covering over the deposited metal.

These and other objects will become more readily apparent by reference to the following detailed specification and the attached drawings in which.

Figure 1:
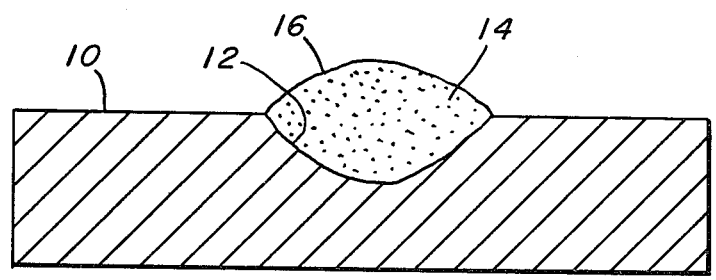
FIG. 1 is a transverse cross-section of an eroded mold stool and the necessary material to accomplish our method.

As shown in FIG. 1, a mold stool 10 has been eroded in service to such an extent that a crater 12 exists in the surface of the stool. We repair this stool while it remains on the ingot car, by placing an exothermic reaction mixture 14 inside the crater 12. The mixture 14 is deposited in an amount sufficient to overfill the crater 12 so that a mound 16 of mixture 14 is formed. Ideally, about a 50% excess of mixture 14 is desired. As shown, the 50% excess is domed over the crater 12. The mixture 14 is preferably an aluminothermic reduction (ATR) reaction mixture. The mixture consists of about three parts powdered iron oxide, which is preferably $Fe_2O_3$ and not finer than +200 mesh, and preferably having a size at least as fine as −35 mesh, one part aluminum powder preferably having a size between about −100 mesh and +400 mesh. Other fuels that might be used instead of aluminum are magnesium, calcium, silicon and calcium-silicon alloy or mixtures thereof. The ATR mixture 14 is ignited by a flame, flare or hot filament. The reaction causes the formation of a superheated melt comprising a metal phase 20 (FIG. 2) and a slag phase 22. The more dense metal phase quickly separates from the melt and settles to the bottom where it becomes metallurgically bonded to the stool. Any oxide scale which may have existed on the surface of the mold stool is either chemically reduced or melted with the overlaying slag phase 22. It is believed that this "in situ" bulk deposition process uses the heat of reaction efficiently to provide a mechanism for cleaning and descaling the surfaces, thereby enhancing the formation of additional filler material which becomes welded to the stool. Upon cooling, a metal phase 20 has been weld bonded to the stool 10. The overlaying slag phase 22 is firmly attached to the metal phase 20 therebeneath, and is left in place to provide additional, although temporary, protection from erosion.

In earlier efforts to deposit an ATR metal within such a cavity as shown in the above description, it was thought that the base metal casting had to be substantially preheated prior to application of the ATR mixture in order to assure sufficient heat at the solid-liquid interface to weld-bond the ATR metal to the cavity wall. In the practice of this invention, however, such a preheat is not necessary, nor even desirable. In addition, prior to this invention it was also thought that the presence of the slag phase would be detrimental, and hence such slag phase was always removed. Since the slag phase was removed, it was necessary therefore to provide sufficient ATR mixture so that the entire crater was filled with the reaction metal. The overlaying slag phase was then broken-away and discarded. Since a considerably greater amount of deposited metal was necessary, a correspondingly greater amount of ATR mixture was necessary. As noted above, this then necessitated building or placing a refractory containment perimeter system around the cavity to contain the extra ATR mixture and reaction products so that the metal would enter the cavity. In practice, it was found necessary that the loose ATR mixture have a volume of approximately six times greater than the volume of the cavity. In the above practice, however, wherein both reaction products are to fill the cavity, i.e. the metal and slag phases, the ATR mixture should have a volume of one and a half times that of the crater in order to fill the crater. Accordingly, a refractory perimeter system is not necessary, and hence the repair can be effected without the need of any apparatus whatsoever.

Figure 2:
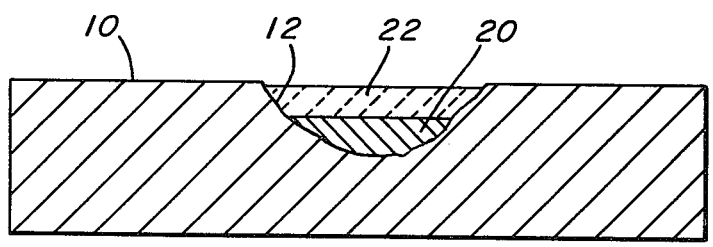
FIG. 2 is a transverse cross-section of a mold stool repaired by the invented method.

In the above-described embodiment of this invention it was noted that in order to fill the cavity flush full with the metal and slag phases, the loose ATR mixture provided should have a volume about 50% greater than the volume of the cavity. It should be noted, however, that it is not necessary that the metal and slag phases completely fill the cavity. Indeed, the upper surface of the slag phase 22 may be lower than the upper surface of the mold stool 10 without sacrificing any advantages. In some applications, it may even be desirable that the cavity be under-filled as the slag phase 22 tends to "lock" in place into the cavity walls. In addition to the above modifications, it is not necessary that all of the ATR mixture be applied in the cavity at one time. For example, the cavity can be partially filled with ATR mixture, the mixture reacted, and then subsequently more ATR mixture may be added and then reacting that the mixture. If the reaction products from the first added ATR mixture are still molten when the second ATR mixture is added, the two metal phases and the two slag phases will combine to yield just two phases substantially as shown in FIG. 2. However, if the reaction products from the first added ATR mixture have solidified when the second ATR mixture is added, four distinct layers will be formed, i.e. metal and overlaying slag from the first ATR mixture and then second metal and slag layers thereover from the second ATR mixture.

The above described procedure for adding the ATR mixture at two different times does provide one advantage in that upper slag layer formed when the second ATR mixture is reacted tends to be more dense, i.e. less porous. It is believed that the first ATR reaction results in some slag porosity because the reaction is in contact with the cast iron mold stool, and carbon in the cast iron reacts with oxygen in the ATR mixture to form some $CO_2$. However, the second ATR products are exposed to substantially less cast iron surface, and hence less $CO_2$ is formed. It is interesting to note that this greater slag density results whether or not the first ATR reaction products have solidified when the second ATR mixture is added.

Figure 3:
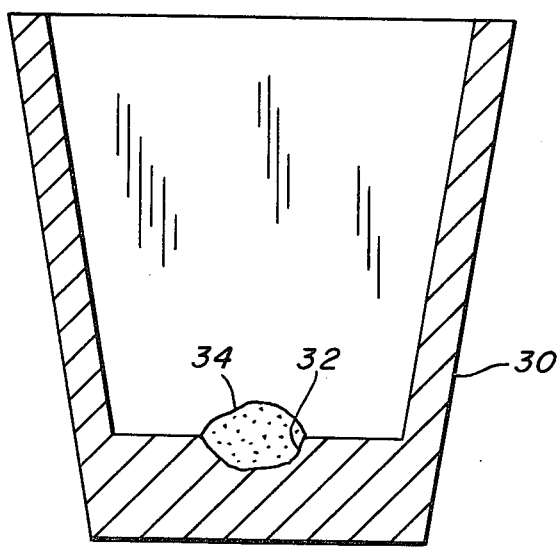
FIG. 3 is a transverse cross-section of a big-end-up (BEU) ingot mold set-up according to another embodiment of our method of depositing an abrasion-resistant monolithic ceramic liner in the bottom thereof.
Figure 4:
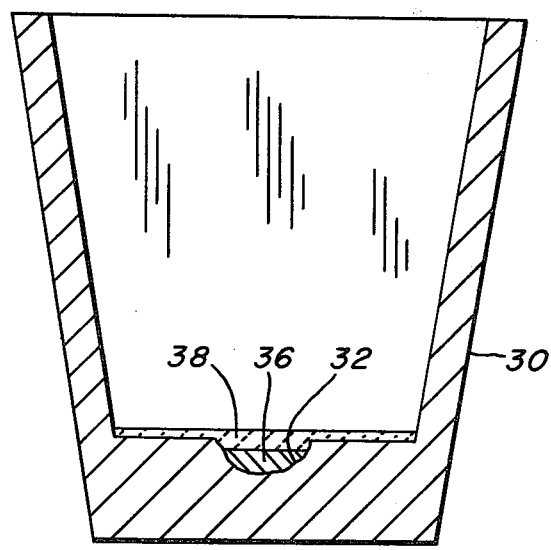
FIG. 4 is a transverse cross-section of the ingot mold of FIG. 3 after deposition of a ceramic bottom liner.

The above embodiment describes a method of filling a cavity in a mold stool 10. It should be realized however, that the exact same procedure could be used for filling a cavity in the bottom of a closed-bottom ingot mold. Insofar as closed-bottom ingot molds are concerned, we have successfully utilized another embodiment of this invention wherein the entire bottom of the ingot mold is provided with a nonlithic slag layer. FIGS. 3 and 4 illustrate this embodiment wherein a closed-bottom ingot mold 30, having an erosion cavity 32 in the bottom thereof is repaired. In this embodiment, sufficient ATR mixture 34 is provided to cover the bottom of the mold to a depth no greater than about three inches, as sufficient to assure that the ATR reaction slag phase 36 not only fills the upper portion of cavity 32 but also forms a thin layer of slag completely covering the bottom of mold 30. The metal phase 36 will be securely bonded to the bottom of the cavity 32, while the slag phase 38 will be attached to the metal phase 36 and the bottom of the ingot mold 30. Ideally, the slag phase layer should not be more than about one or two inches thick, since thicker deposits may result in shorter ingots stripped therefrom, unless of course, special overly tall ingot molds are involved.

In the above described embodiment, it is important that only the slag phase 38 be allowed to over-fill cavity 32 for best results. If the metal phase 36 covers the entire bottom of the ingot mold 30 problems may be encountered. Specifically if the metal layer is thick, the slag layer will be even thicker and hence the depth of the mold will be appreciably reduced. This will result in appreciably shorter ingot cast therein. On the other hand, if such a metal phase layer is thin, the heat therein is quickly dissipated to the mold bottom, and hence the metal does not form a good bond with the mold bottom. For optimum results therefore, the amount of ATR mixture used in this embodiment should be such that the entire metal phase is contained within the cavity so that only the slag phase extends from mold wall to wall. This would require that the volume of ATR mixture used should be more than 1.5 times the volume of the cavity, i.e. that amount necessary to fill only the cavity with metal and slag; and should be less than 5 times the volume of the cavity, i.e. that amount which would completely fill the cavity with metal phase.

Since the overlaying slag deposit in each of the above embodiments is rather brittle, continued use of such a repaired stool or ingot mold will eventually cause the slag phase to spall and break away. For this reason it was originally thought that the slag phase should be removed before the repaired part was placed in service, as noted above. That is, it was feared that the slag phase would break away as steel was teemed into the mold and end up within the cast ingot. Contrary to these fears, however, we have utilized the above procedures to repair many stools and molds and have never encountered an ingot contaminated with slag inclusions from the ATR repair. Accordingly, not only does the slag deposit not cause ingot contamination, but it does provide the beneficial result of being less susceptible to melt away erosion during teeming. Hence, the slag phase does provide extra protection from erosion and does extend the life of the repaired stool or mold.

We claim:

1. A method of repairing an erosion cavity in ingot mold stools and the bottoms of closed-bottom metal molds comprising:
    placing in said cavity an exothermic reaction mixture consisting essentially of a fuel powder and a metallic oxide, the amount of said mixture having a volume no greater than one and a half times the volume of the cavity;
    igniting said mixture to form a superheated melt comprising a metal phase and a slag phase, such that said melt is contained entirely within said cavity,
    maintaining said melt in said cavity for a time sufficient to allow said melt to separate so that said metal phase is at the bottom and the slag phase thereover,
    permitting said melt to solidify with the metal phase securely bonded to the bottom of the cavity and said slag phase securely attached to said metal phase, and permitting said slag phase to remain in said erosion cavity during subsequent use of said mold or mold stool to thereby provide extra protection from erosion and extend the life of the repaired stool or mold.

2. A method in accordance with claim 1, wherein said fuel powder is aluminum.

3. A method in accordance with claim 2, wherein said aluminum powder has a size consisting of −100 mesh and +400 mesh.

4. A method in accordance with claim 1, wherein said metallic oxide is $Fe_2O_3$.

5. A method in accordance with claim 4, wherein said $Fe_2O_3$ is at least as fine as −35 mesh.

6. A method in accordance with claim 1, wherein said exothermic reaction mixture comprises a substantially stoichiometric mixture of $Fe_2O_3$ and aluminum powders.

7. A method in accordance with claim 1, wherein said mold is cast iron.

8. A method in accordance with claim 1 in which a portion of said mixture is placed in said cavity and ignited to form a first melt comprising a metal phase and a slag phase, and thereafter the remaining portion of said mixture is placed in said cavity and ignited to form a second melt comprising a metal phase and a slag phase.

9. A method in accordance with claim 8 in which said first melt is solidified before said remaining portion of said mixture is placed in said cavity.

10. A method in accordance with claim 8 in which said first melt is still molten when said remaining portion of said mixture is placed in said cavity.

11. A method in accordance with claim 8 in which mixture is divided into more than two portions each of which are individually placed in said cavity and ignited.

12. A method of repairing an erosion cavity in the bottom of a closed-bottom ingot mold comprising:
    placing in the bottom of said mold an exothermic reaction mixture consisting essentially of a fuel powder and a metallic oxide, the amount of said mixture having a volume greater than 1.5 times the cavity volume but less than 5 times the cavity volume,
    igniting said mixture to form a superheated melt comprising a metal phase and a slag phase,
    maintaining said melt at the bottom of said mold for a time sufficient to allow said melt to separate into a metal phase and a slag phase, said metal phase separating to the bottom and being entirely contained within said cavity, while said slag phase covers the entire bottom of the mold,
    permitting said melt to solidify with the metal phase securely bonded to the bottom of the cavity and said slag phase securely attached to the metal phase to provide a slag surface over the entire bottom of the mold, and permitting said slag phase to remain in on said mold bottom during subsequent use of said mold to thereby provide extra protection from erosion and extend the life of the repaired mold.

13. A method in accordance with claim 12, wherein said fuel powder is aluminum.

14. A method in accordance with claim 13, wherein said aluminum powder has a size consisting of −100 mesh and +400 mesh.

15. A method in accordance with claim 12, wherein said metallic oxide is $Fe_2O_3$.

16. A method in accordance with claim 15, wherein said $Fe_2O_3$ is at least as fine as −35 mesh.

17. A method in accordance with claim 12, wherein said exothermic reaction mixture comprises a substantially stoichiometric mixture of $Fe_2O_3$ and aluminum powders.

18. A method in accordance with claim 12, wherein said mold is cast iron.

19. A method in accordance with claim 12 in which said slag phase is no thicker than about 2 inches.

* * * * *